United States Patent
Coldiron, Sr. et al.

(10) Patent No.: US 6,825,801 B1
(45) Date of Patent: Nov. 30, 2004

(54) OUTER LOOP TEST GENERATOR FOR GLOBAL POSITIONING SYSTEM

(75) Inventors: Gary L. Coldiron, Sr., Bloomington, IN (US); John W. Dove, Bloomfield, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/750,635

(22) Filed: Dec. 11, 2003

(51) Int. Cl.[7] .................. H04B 7/185; H04B 17/00; G01R 31/00; H04L 1/00
(52) U.S. Cl. ................ 342/357.06; 375/224; 370/249
(58) Field of Search .............. 342/357.06, 357.13; 370/242, 249; 375/224–228; 455/226.1–226.4; 702/94

(56) References Cited

U.S. PATENT DOCUMENTS

| | | |
|---|---|---|
| 3,057,972 A | 10/1962 | Mann |
| 3,845,484 A | 10/1974 | Sawicki et al. |
| 3,875,500 A | 4/1975 | Fletcker et al. |
| 4,377,822 A | 3/1983 | Noirel et al. |
| 4,503,536 A | 3/1985 | Panzer |
| 4,641,254 A | 2/1987 | Mitchell |
| 4,825,459 A | 4/1989 | Farrow et al. |
| 4,977,579 A | 12/1990 | Bateman |
| 5,153,599 A | 10/1992 | Harigae et al. |
| 5,610,614 A | 3/1997 | Talbot et al. |
| 5,898,905 A | 4/1999 | Aldridge et al. |
| 6,201,953 B1 | 3/2001 | Dwyer |
| 6,216,095 B1 | 4/2001 | Glista |
| 6,307,879 B1 | 10/2001 | Moriyama |
| 6,385,236 B1 | 5/2002 | Chen |
| 6,434,376 B1 | 8/2002 | Black |
| 2002/0075945 A1 * | 6/2002 | Farine et al. ............ 375/148 |

FOREIGN PATENT DOCUMENTS

JP  08220173 A  *  8/1996  .......... G01R/31/00

OTHER PUBLICATIONS

English translation of JP 08220173 A.*

* cited by examiner

Primary Examiner—Bernarr E. Gregory
Assistant Examiner—Fred H Mull
(74) Attorney, Agent, or Firm—John L. Tarlano

(57) ABSTRACT

The present application discloses a global positioning satellite emulator which produces an L-1 test signal of a particular user selected global positioning satellite for testing the capacity of a GPS receiver to lock on to the signal of the selected satellite and to properly receive, decode and process the signal. The device of the present invention is relatively inexpensive to manufacture, compact and easily connected to facilitate convenient use. The application also discloses the process by which the capacity of a GPS receiver to lock on to the signal of a particular satellite and properly receive, decode and process the signal may be tested.

7 Claims, 14 Drawing Sheets

OUTER LOOP TEST GENERATOR FOR GLOBAL POSITIONING SYSTEM

STATEMENT OF GOVERNMENT INTEREST

The invention described herein may be manufactured and used by or for the Government of the United States of America for Governmental purposes without the payment of any royalties thereon or therefore.

BACKGROUND a. Field of Invention

The invention relates to the equipment and process for testing the capacity of a global positioning system (GPS) receiver to lock on to the transmitted signal of a particular satellite and properly process the signal.

b. Background of the Invention

The Global Positioning Satellite (GPS) system is widely used by civilian and military personnel to obtain a precise determination of position on or near the surface of the earth. The system is comprised of a constellation of satellites in earth orbit and positioned such that a sufficient number of satellites (typically 4) will be in range to communicate on a line of sight path with a receiving unit anywhere on the surface of the earth. The constellation of satellites is monitored and maintained from a number of earth based stations. The earth based stations send data to the satellites, to be stored and subsequently transmitted to GPS receivers, as needed. The information includes the satellites' orbital elements, almanac information containing abbreviated orbital elements, ranging measurement corrections and status flags. A user of the GPS must establish communication between his or her receiver and a sufficient number of satellites with up-to-date data and in working order. The receiver must receive the satellite communications including time of transmission and navigation data message, and triangulate the position of the receiver by solving the position equation. Although the system is generally reliable, it depends on the proper functioning of multiple satellites in earth orbit as well as the proper functioning of the receiver.

The primary signal transmitted by the satellites is known as L-1 and is a biphase shift keying modulator modulated with a 1.023 MHz pseudo random noise coarse acquisition code. The coarse acquisition code repeats once each millisecond. The GPS receiver demodulates the received code from the L-1 carrier and compares the transmitted coarse acquisition code with coarse acquisition codes generated by the receiver. The receiver mimics the code of each satellite until it reproduces one that matches the transmission coming from the satellite and thereby identifies the correct satellite. The system currently in use provides for 36 separate coarse acquisition codes. The coarse acquisition code is the modulo-2 sum of two 1023 bit linear patterns designated as G-1 and G-2. The G-2 pattern is selectively delayed by an integer number of chips, which number varies for each of the 36 separate and unique variations. The result is that each satellite has a unique time delay in its G-2 signal such that when the G-2 is modulo-2 added to the G-1 signal a unique one of the 36 possible coarse acquisition codes is produced.

The navigation message is a 1500 bit data word transmitted at a rate of 50 bits per second. The message contains the time of transmission, the satellite position, satellite health, satellite clock correction, propagation delay effects, time transfer to UTC and constellation status. The navigation message effectively modulates the coarse acquisition code and is transmitted along with the L-1 carrier.

In many locations such as underwater, underground or inside a metal building, a GPS satellite signal cannot be received by a GPS receiver. In order to receive the signal, the receiver must be moved to an exposed position where the signal is accessible. In military (and in some other) situations there may be a need for covert operation and the time of exposure must be minimized. It helps in this regard to know in advance that the GPS equipment is fully functional before moving to the exposed location to communicate with the satellites. This avoids downtime while exposed, but it also requires pre-testing of the equipment out of range of the satellites. The basic operation of the receiver can be tested, by known methods, but the capacity of the receiver to receive GPS data cannot be easily confirmed. The equipment which generates the satellite signals can be reproduced in the laboratory but the size of this equipment makes it impractical for use in the field.

The GPS receiver can be tested by other methods currently known in the art. There are a number of existing systems that test, calibrate, and/or otherwise assist GPS receivers in acquiring/locking onto signals from GPS satellites (e.g. shortening the time to "first fix"). For example, U.S. Pat. Nos. 6,400,314, 6,064,336, and 5,841,396 to Krasner disclose the use of a precision carrier frequency, emanating from a base station, for calibrating local oscillators (i.e. GPS receivers). The GPS receiver disclosed in U.S. Pat. No. 6,320,536 to Sasaki utilizes signals from a stationary satellite to shorten the time required to lock onto the signals from the target GPS satellite. The GPS receiver disclosed in U.S. Pat. No. 5,663,735 to Eshenbach utilizes information derived from a standard time and/or standard frequency radio signal for the purpose of pre-tuning to the carrier frequency of the target GPS satellite. Finally, U.S. Pat. No. 6,289,041 to Krasner discloses a GPS receiver that utilizes a psuedo-random noise matching filter method, requiring the processing of a plurality of GPS satellite-generated signals, to achieve both fast signal acquisition and a high degree of sensitivity. Unfortunately, none of these four apparatus incorporate a fully self-contained design . . . all require one or more signals to be received from some remote source. It would be greatly advantageous to provide a fully self-contained design for a device to test the capacity of the receiver to lock on the signal of particular satellites and to properly process their signals ("self-contained" meaning that the signals required to test/calibrate the operation of the GPS receiver's outer loop antenna path are generated internally by the device).

SUMMARY OF THE INVENTION

It is an object of the invention to provide a compact, low physical profile and affordable GPS satellite emulator which can produce the L-1 signal of each of the GPS satellites within the constellation of the system.

It is an object of the invention to provide a satellite emulator which can quickly test the outer loop antenna path of a GPS receiver to confirm the capability to receive and process a GPS satellite signal.

It is a further object of the invention to provide an emulator equipped with switches to allow a user to vary the output of the emulator to match the signal of a specific satellite.

It is yet another object of the invention to provide an emulator equipped with a main oscillator having a relatively broad range of accuracy, to reduce the size and cost of the device of the present invention.

According to the present invention, the above-described and other objects are accomplished by a GPS satellite emulator that uses a single oscillator to provide a 10.23 MHz clock signal and 1.57542 GHz signal to a biphase shift keying modulator, which outputs the emulated satellite signal. The oscillator is selected to have a frequency accuracy of +/-10 KHz and is connected through an attenuator to the biphase shift keying modulator. The attenuator reduces the signal power of the output to -70 dBm. The relatively wide range of frequency accuracy allows for the selection of a relatively small sized oscillator and the attenuator reduces the signal power to a value near the typical signal strength of a satellite, which is approximately -120 dBm. The oscillator, attenuator and biphase shift keying modulator comprise the radio frequency components of the satellite emulator.

The GPS receiver is sufficiently sensitive to discern a signal at the power level output by the satellites and is susceptible to interference from radio frequency leakage. The present invention includes a metal case enclosing the oscillator to minimize the interference from radio frequency leakage. Additionally, the reduced power output of the satellite emulator acts to reduce the amount of radio frequency leakage interference.

The digital circuitry divides the 10.23 MHz signal by a factor of 10 to produce a 1.023 MHz clock signal which times the function of the digital circuitry of the device. The 1.023 MHz clock signal is input to a series of three cascading 4-bit counters and a flip-flop to produce a G-Epoch which repeats a pulse once for every 1023 cycles of the clock signal, to reload the circuitry for the G-1 and G-2 signals and to provide a base clock signal to output the navigation data The device uses a 10-bit shift register, receiving input from the 1.023 MHz counter and the G-Epoch to output a G-1 signal. The G-1 signal is modulo-2 added to the G-2 signal, which is generated in a unique manner. The device uses 10-bit linear feedback shift registers, clocked and shifted out by the 1.023 MHz clock signal. The G-epoch signal reloads the shift registers which generate a 10-bit output. This output is parallel input to a pair of multiplexers, which are both decoded by an EPROM, to obtain a serial G-2 output from the multiplexers. The EPROM is encoded by a set of user set switches and a memory containing the appropriate equivalent delay count for each satellite, in the constellation. The switches can be set to encode the EPROM for the delay count of any of the satellites. The EPROM decodes the two multiplexers, to produce a G-2 serial output, which is modulo-2 added to produce the G-2 signal unique to the selected satellite. The arrangement of digital circuit elements produces the G-2 signal for any user selected satellite in the constellation, from the compact device of the present invention. The G-1 and G-2 signals are modulo-2 added according to known practice, to produce the coarse acquisition code for the selected satellite.

A navigation message is stored in a second EPROM. The device down converts the G-Epoch signal to 50 Hz to shift out the navigation message at the required rate. The navigation message is comprised of 30-bit subframes, which are stored in bytes of 8-bit segments, within the second EPROM. Every fourth byte contains two bits which are not a part of the navigation message. The device parallel outloads 4 bytes per subframe but shifts only 30 of the bits, while maintaining the 50 Hz clock rate. A unique circuitry block clocks a counter chain and loads a shift register circuit in a patterned sequence, to count through the addresses of the second EPROM, counting 8 bits of 3 bytes and counting 6 bits of a fourth byte before loading a new subframe. The shift register circuit is clocked by the 50 Hz signal to shift out the navigation message at the clock rate and including 30 bits from each of the subframes stored in the second EPROM. A typical satellite navigation message is output at a 50 Hz frequency.

The navigation message is modulo-2 added to the coarse acquisition code and the output sum is a pseudo random noise signal, for a particular satellite, however; the combinational logic components which complete the modulo-2 addition, produce misaligned pulse edges in the pseudo random noise signal. In order to resolve the misaligned pulse edges, the signal is input to a novel glitch elimination circuit. The glitch elimination circuit receives input of the 1.023 MHz clock signal. It effectively delays the output of the pseudo random noise signal by approximately 111 nanoseconds. The delay allows the inadvertent pulses coming from the inherent misaligned logic edges, caused by the modulo-2 addition steps, to reach a settled state before being clocked through to the output. The signal is input to the biphase shift keying modulator with the 1.57542 GHz carrier and output at radio frequency in the form of the transmission from the selected satellite, as a pure GPS signal, free from glitches. The satellite emulator of the present invention is compact and suitable for use in the field.

DETAILED DESCRIPTION OF THE PREFERRED EMBODIMENT

In the existing GPS system, each satellite transmits two microwave carrier signals. The L1 frequency (1575.42 MHz) carries the navigation message and the Standard Positioning Service (SPS) code signals. The L2 frequency (1227.60 MHz) is used to measure the ionospheric delay by Precise Positioning System (PPS) equipped receivers. Two binary codes modulate the L1 signal to produce a pseudo random noise code, which is unique to each satellite and is used to identify it. The C/A (coarse acquisition) code is a 1.023 MHz Pseudo Random Noise (PRN) signal which repeats every 1 ms. This noise-like code modulates the L1 carrier signal, "spreading" the spectrum over a 1MHz bandwidth. The C/A code repeats every 1023 bits (one millisecond).

The Navigation Message also modulates the L1-C/A code signal. The Navigation Message is a 50 Hz signal consisting of data bits that describe the GPS satellite orbits, clock corrections, and other system parameters.

The present invention is a compact and portable satellite emulator, and method of use thereof for testing the capacity of a GPS receiver to lock onto the signal of a particular satellite (as described above) and to properly process the signal from the satellite. The satellite emulator generates the L1 signal of a user selected satellite and delivers the signal to the outer loop path of the GPS receiver, bypassing the GPS receiver antenna.

In order to operate the satellite emulator of the present invention the user disconnects the existing antenna from the antenna jack of the receiver, and positions a set of switches on the satellite emulator in accordance with the signal characteristics of the particular satellite for which the receiver is to be tested. The user then connects the output of the satellite emulator to the vacant antenna jack of the receiver by coaxial cable and energizes the satellite emulator and the receiver. Normally, the receiver displays a solid bar, on a viewing screen, to indicate that a signal from a satellite is being received and processed. In the same manner, if the solid bar appears on the unit under test the receiver has the capacity to receive and process the signal from the satellite, which the user has selected. The user would disconnect the coaxial cable and reconnect the antenna to the receiver, which has now been tested and is ready for use.

The satellite emulator achieves the foregoing by issuing signals similar to an L-1 signal normally issued from a given space vehicle (SV) as part of the GPS constellation. Certain military vehicles and personnel often have need for covert operation and may need to test their GPS receiver before moving to an exposed location. The present invention provides this confidence.

Figure 1:
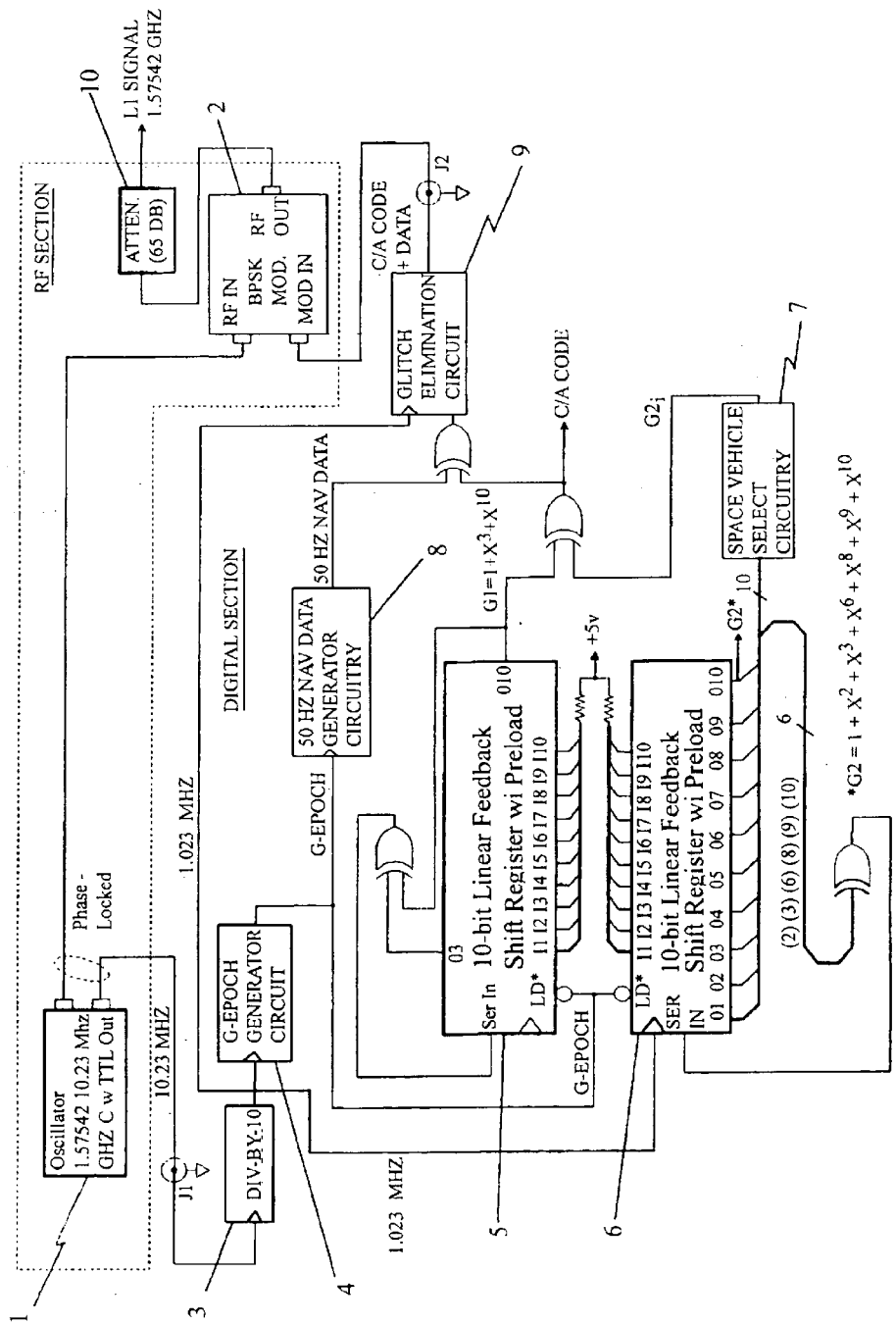
FIG. 1 is a block diagram of the satellite emulator according to one embodiment of the present invention.

The satellite emulator invention, depicted in the block diagram of FIG. 1, has a radio frequency section, delineated by dotted lines in FIG. 1, and a digital section.

The radio frequency section comprises an oscillator 1, which produces two phase-locked output signals, a biphase shift keying modulator 2 and an attenuator 10, all of which can be mounted on a single wide VME card as a matter of design choice. The oscillator 1 is enclosed in a metal case to reduce radio frequency leakage and produces a 1.57542 GHz carrier signal which is output to the biphase shift keying modulator 2. The oscillator 1 also produces a 10.23 MHz clock signal which is input to the digital section. The output from the digital section, which is the result of the processing described in detail below, is input to the biphase shift keying modulator 2 with the carrier signal and output to the attenuator 10. The attenuator 10 reduces the signal power level to approximately −70 dBm to approximate the strength of a satellite signal and to further reduce the radio frequency leakage interference. It is preferred that the oscillator 1 be selected to have a frequency accuracy as great as +/−10 KHz to enable the use of a relatively small sized and inexpensive component to serve the purposes of the present invention. The relatively broad range of accuracy is possible because of the compensating circuitry typical of the GPS receivers.

Figure 5A:
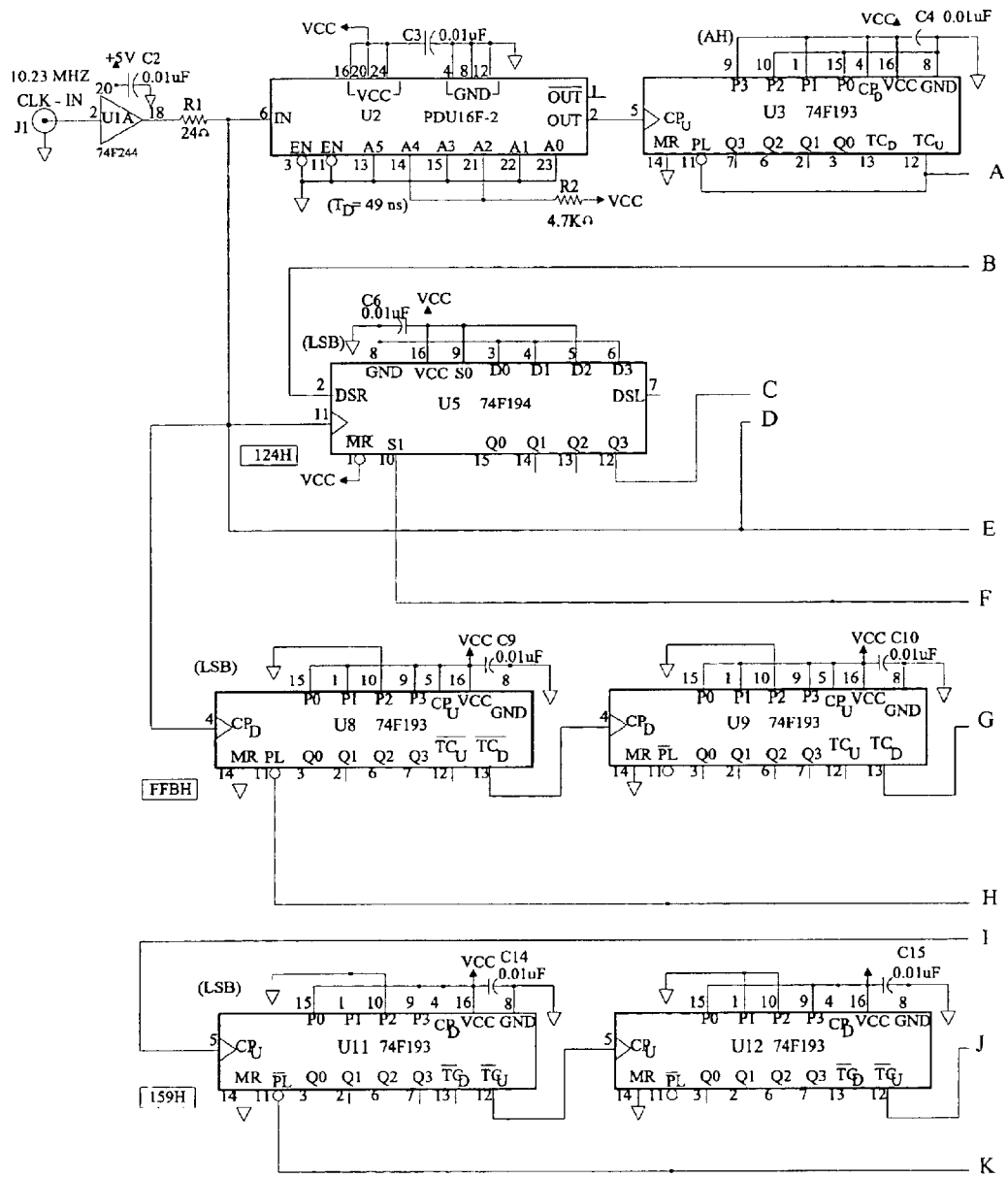
FIGS. 5A-J are a collective schematic diagram of the digital section.
Figure 5B:
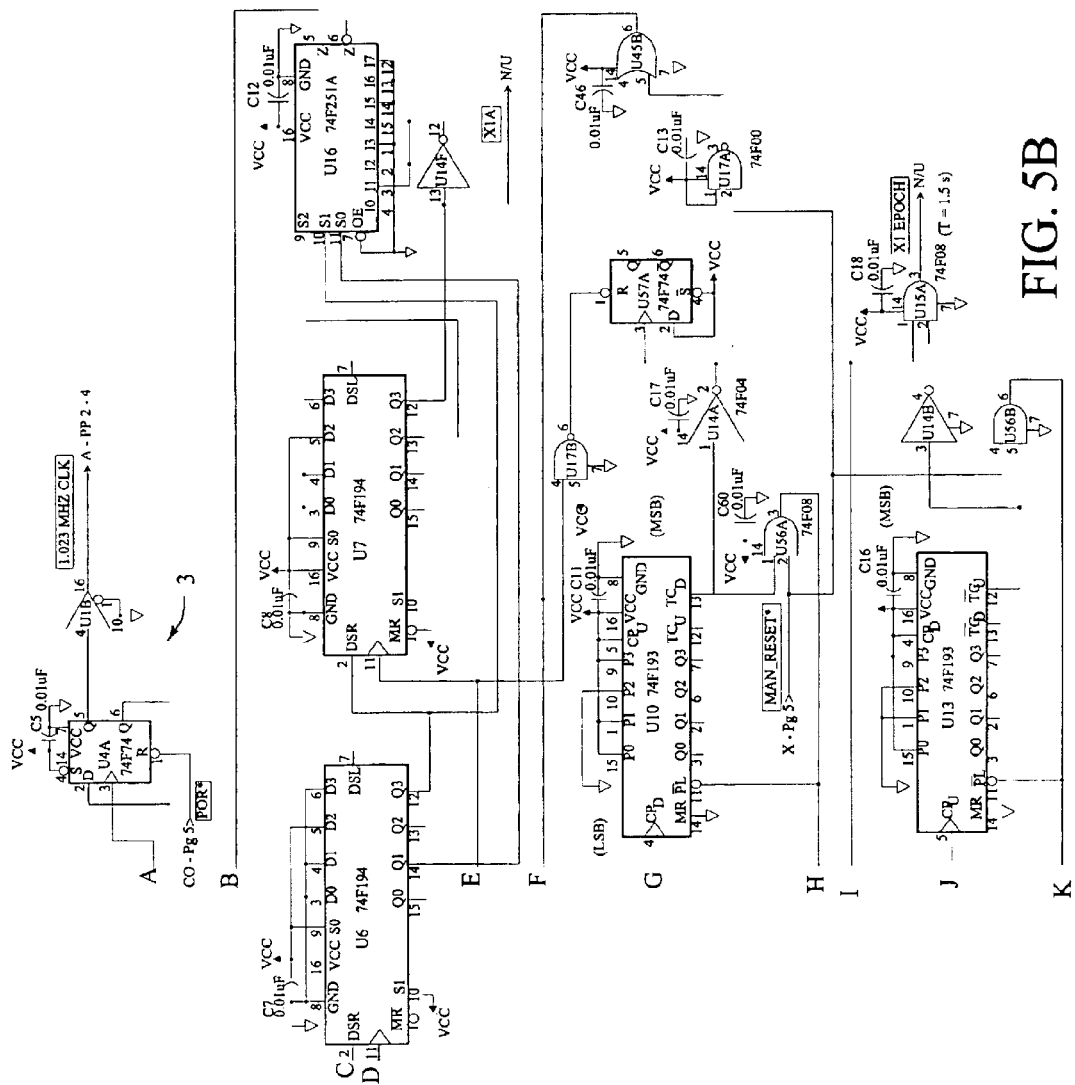

In the digital section, a frequency divider 3 divides the frequency by a factor of 10 to produce a 1.023 MHz clock signal. The frequency divider is shown in detail, in FIGS. 5A-B and includes two 74F244 buffers, designated as U1A and U1B, a 6-bit programmable delay line PDU16F-2, designated as U2, a 4-bit synchronous counter 74F193, designated as U3 and a flip-flop 74F74 designated as U4A. The 10.23 MHz clock signal is input to U2 through U1A. Voltage is maintained on pins A2 and A4 of U2. The U2 output is input to the CPU pin of U3, while voltage is maintained on the CPD pin, the P1 pin and the P3 pin. The signal is output from the TCU pin of U3, which delivers a pulse on every $5^{th}$ input pulse and changes the state of the flip-flop, U4A, to output a pulse from the Q pin at the input frequency divided by a factor of ten, 1.023 MHz.

The satellite emulator uses a G-Epoch generator 4, shown in FIG. 1, including three cascading 4-bit counters and a flip-flop to produce a G-Epoch signal from input of the 1.023 MHz clock. The G-Epoch generator 4 is shown in detail in FIGS. 5C-D and includes three 74F193 4-bit synchronous counters, designated U18, U19 and U20, a 74F74 flip-flop, designated U57B, a 74F32 OR gate, designated U59A, two 74F244 buffers, designated U58A and U58B, two 74F04 inverters, designated U60A, and U14C, and an AND gate designated U56C. The 1.023 MHz clock signal is input on the serial data pin, CPD, of U18, while voltage is maintained on the CPU pin, causing the device to count down as pulses arrive. The device counts its maximum 15 pulses and outputs from the TCD pin to the CPD input of U19. The same process is repeated through U19 and U20; however, the pins,P2 and P3, of U20 are grounded, whereas voltage is maintained on the pins P0–P3 of U18 and U19 and also on pins P0 and P1 of U20. The output from the TCD pin of U20 delivers a pulse to U57B when the maximum count of 1023 has cascaded through each of the three 4-bit synchronous counters and a count of zero is reached. The counters U18–U20 of G-Epoch generator 4 count 1023 pulses in one millisecond and clock the flip-flop U57B, which outputs a pulse which is of short duration, approximately 440 nanoseconds, because the next clock pulse returns the count to 1023 and triggers the flip-flop U57B to end the pulse.

The satellite emulator has a first 10-bit linear feedback shift register 5 circuit, shown in FIG. 1, which receives input of the 1.023 MHz. clock and the G-Epoch signal. The 1.023 MHz. clock inputs pulses to be counted and shifts out satellite G-1 code. The G-Epoch signal reloads the shift registers. The first 10-bit linear feedback shift register 5 is shown in detail in FIGS. 5E-F and includes three 74F194 4-bit shift registers, designated U26, U27 and U28 and an exclusive OR gate designated U25A (the preferred embodiment uses 74F86 quad 2-input exclusive OR gates to provide the exclusive OR gates used in the circuitry). Each of the 4-bit shift registers is clocked and shifted by the 1.023 MHz clock signal and reloaded by the G-Epoch signal applied to S1, while voltage is maintained on So. Voltage is also maintained on pins D0–D3 of U26 and U27. Voltage is maintained on pins D0 and D1 of U28, while pins D2 and D3 are grounded. The output from the Q3 pin of U26 is input to the DSR pin of U27 and the output from the Q3 pin of U27 is input to the DSR pin of U28. The output from Q2 of U26 and Q1 of U28 are input to exclusive OR gate U25A and the output from the exclusive OR gate is input to the DSR pin of U26. The output from the Q1 pin of U28 is the G-1 signal pattern.

Figure 5C:
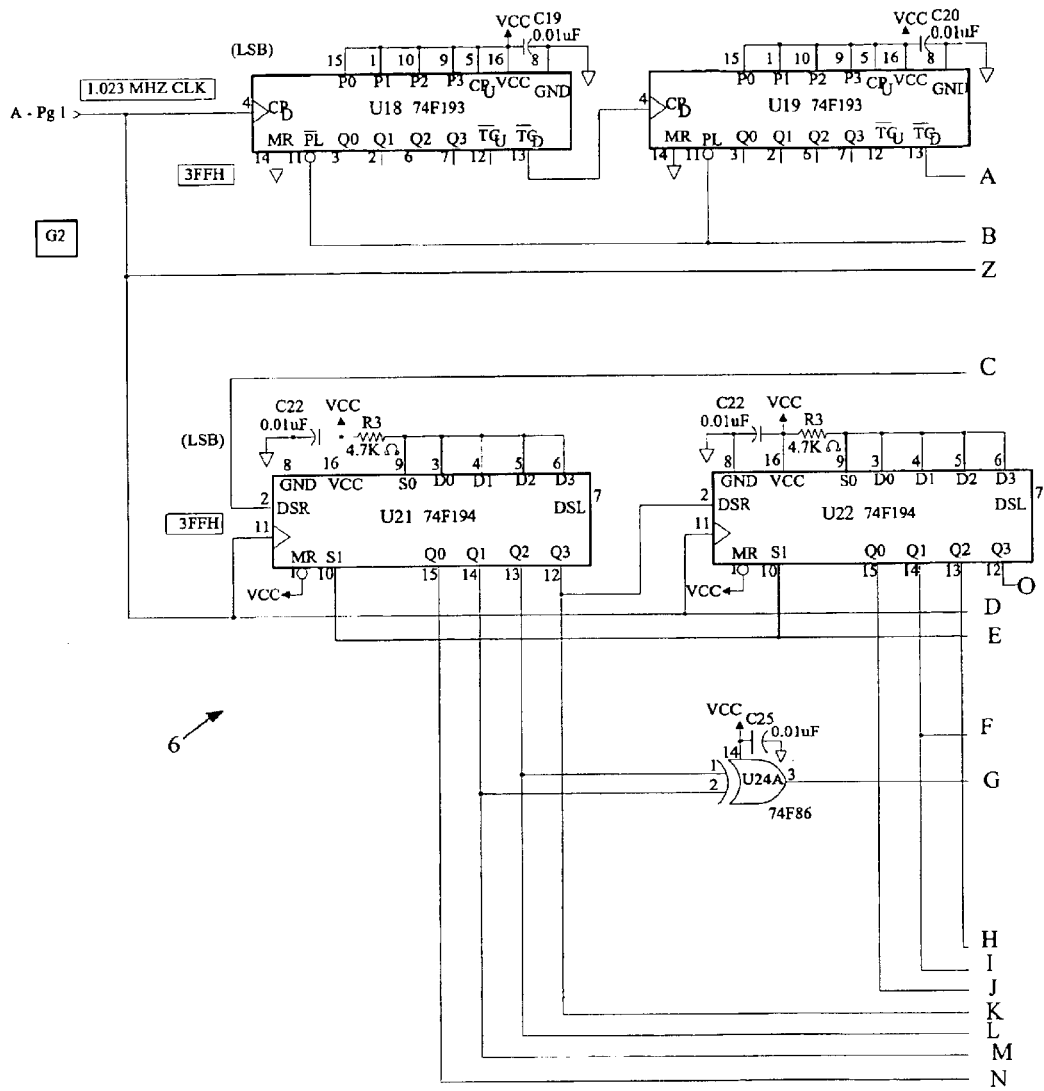
Figure 5D:
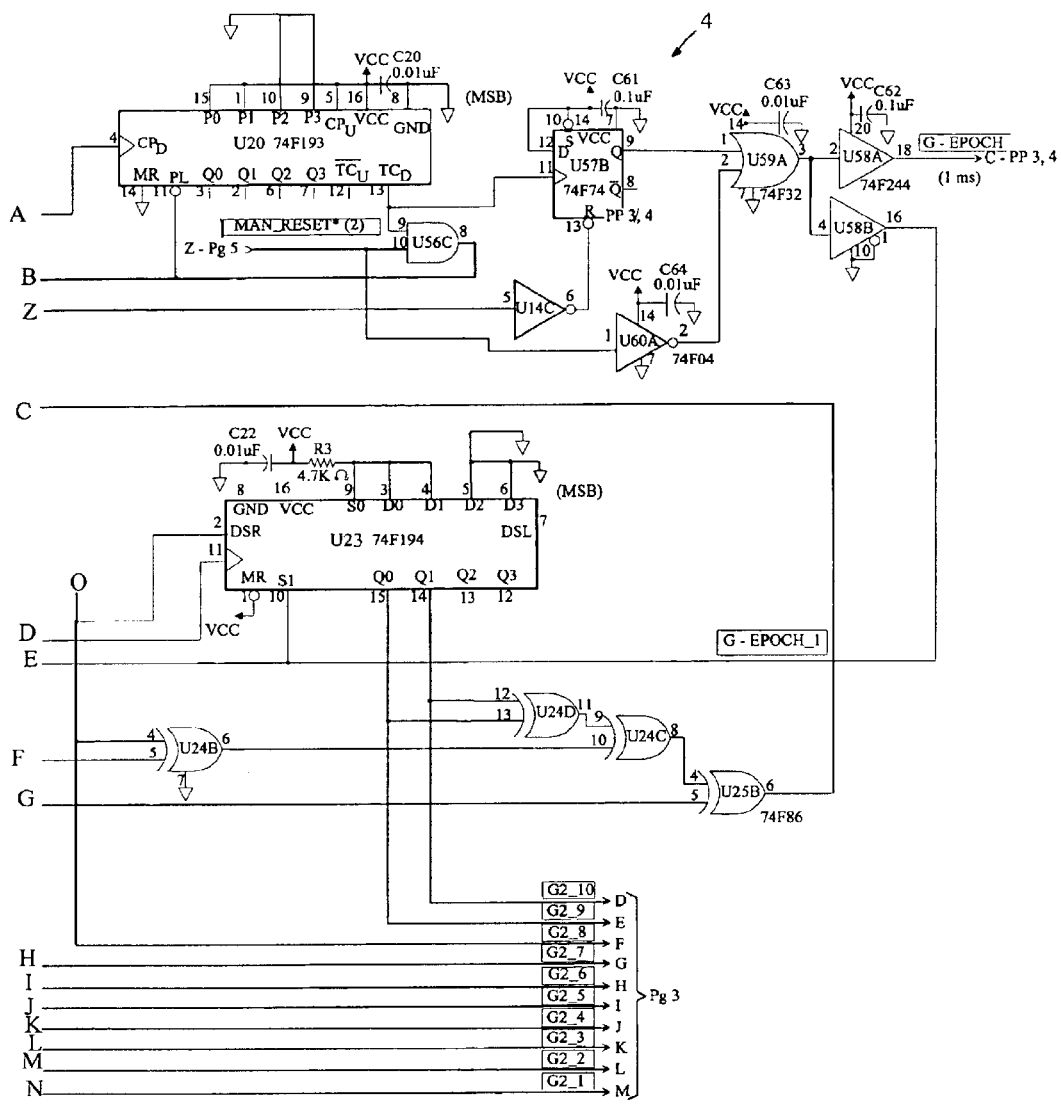
Figure 5E:
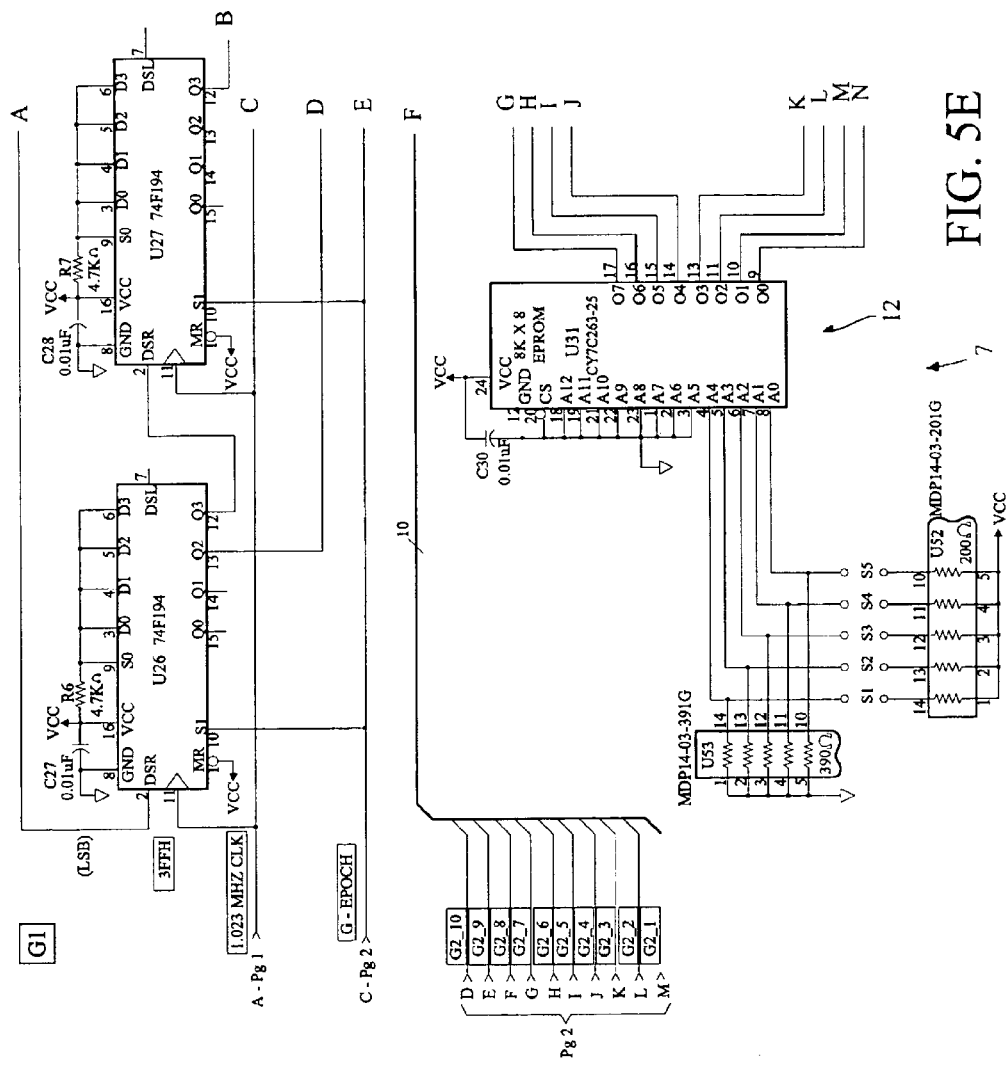
Figure 5F:
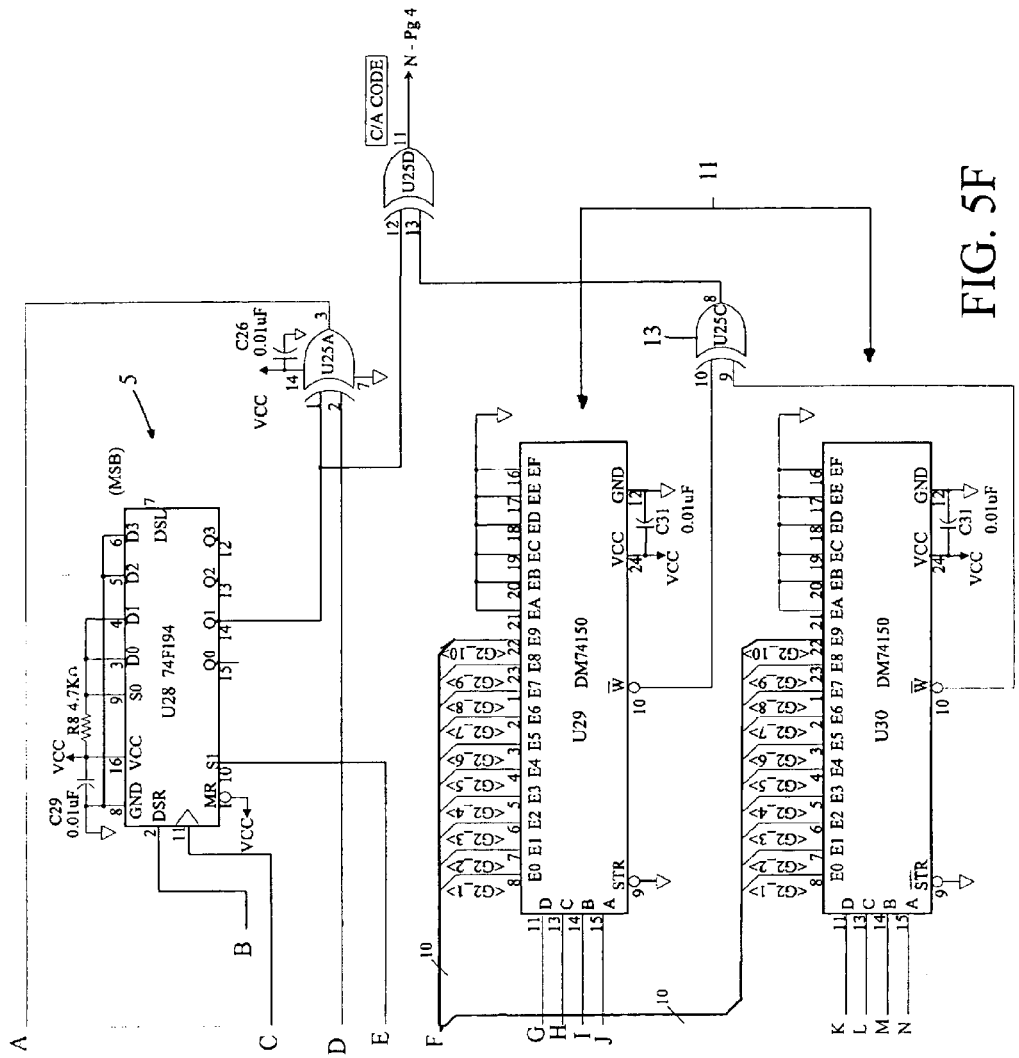

The satellite emulator has a second 10-bit linear feedback shift register 6 circuit shown in FIG. 1, which receives input of the 1.023 MHz clock and the G-Epoch signal. The 1.023 MHz clock inputs the pulses to be counted and shifts out the 10-bit output. The second linear feedback shift register 6, circuit is shown in detail in FIGS. 5C-D and includes three 74F194 shift registers, designated as U21, U22 and U23 and five exclusive OR gates, designated U24A, U24B, U24C, U24D and U25B. Voltage is maintained on So and the G-Epoch signal is input to S1 on each of the shift registers to reload. Voltage is maintained on pins D0–D3 of U21 and U22. Voltage is also maintained on pins D0 and D1 of U23, while pins D2 and D3 are grounded. The output from the Q1 and Q2 pins of U21, the Q1 and Q3 pins of U22 and the Q0 and Q1 pins of U23 is input through two or more of the five exclusive OR gates, as shown in FIGS. 5C-D, to the DSR pin of U21. The output from the Q0–Q3, of U21 and U22 together with the output from the Q0 and Q1 pins of U23 provides a 10-bit parallel output.

Figure 2:
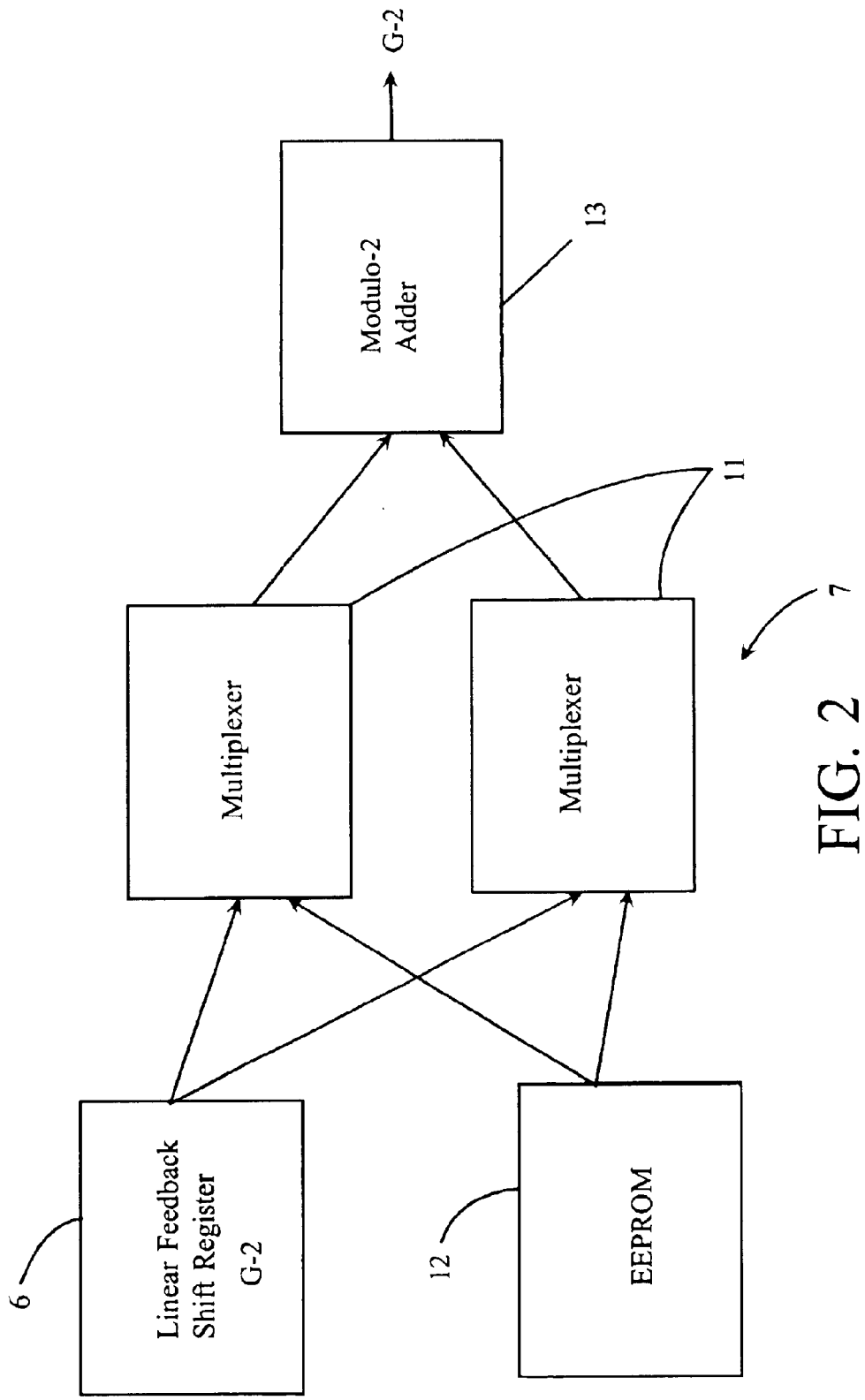
FIG. 2 is a block diagram of the second linear feedback shift register and the space vehicle select circuitry.

The satellite emulator has space vehicle select circuitry 7 including a pair of multiplexers 11 and a first EPROM 12, shown in FIGS. 1 and 2. The first EPROM 12 is encoded for the G-2 signal delay count of a selected satellite by a set of user positioned switches. The 10-bit output is parallel input to each of the pair of multiplexers 11, DM74150, data selector/multiplexers U29 and U30, which are decoded by the first EPROM 12 CY7C263-25 flash memory, designated U31, to output a serial G-2 signal delayed by a specific integer number of chips, shown in detail, in FIGS. 5E-F. The first EPROM 12, U31, outputs a high or low state on each of the eight outputs, O0–O7, as encoded by the positioning of the switches, which are input to the inputs A,B,C and D on each of the pair of multiplexers 11, U29 and U30. The switches are positioned according to a predetermined pattern to match a particular satellite. The pattern of the inputs on A, B, C and D decodes U29 and U30 to output on W, the signal on one of the selected inputs E0–E9. The output of U29 and U30 is modulo-2 added by a modulo-2 adder 13. The modulo-2 adder 13 is an exclusive OR gate, designated U25C. The serial G-2 signal, with a delay which matches that of the satellite selected by the positioning of the switches, is output from U25C.

The same 1.023 MHz clock signal which shifts the G-1 signal, shifts the serial G-2 signal with the delay, so that the G-1 and G-2 of a particular user selected satellite are output. The G-1 and G-2 signals are input to an exclusive OR gate, designated U25D, shown in FIGS. 5E-F and modulo-2 added to produce the coarse acquisition code of the selected satellite.

Figure 3:
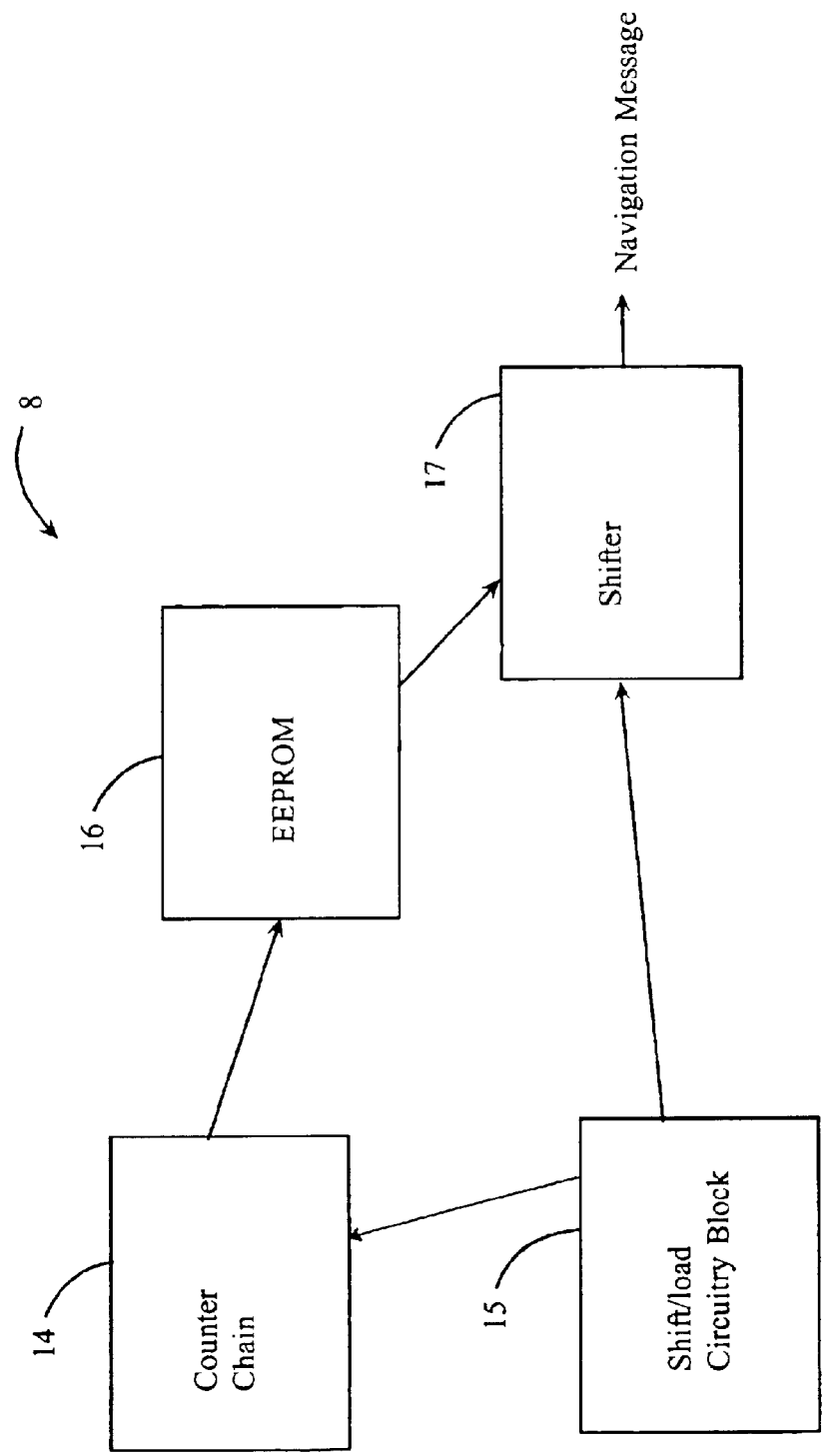
FIG. 3 is a block diagram of the navigation message generator circuit.

The satellite emulator has a navigation message generator circuit 8 including a second EPROM 16, shown in FIG. 3, in which navigation data is stored and a circuit to reduce the G-Epoch signal to 50 Hz data clock. The navigation message consists of a 1500 bit word repeated 40 times. The data is stored in subframes of 30 bits each but the second EPROM 16 holds bytes of 8-bits. It is necessary to parallel out-load 4 bytes per subframe but only shift 30 bits. The navigation message generator circuit 8, also includes a counter chain circuit 14, for counting through the addresses of the second EPROM 16 and also a shifter 17 for shifting out the navigation message, both shown in FIG. 3. A shift/load circuitry block 15, shown in FIG. 3, clocks the counter chain circuit 14 and loads the shifter 17. The 50 Hz signal clocks the shift/load circuitry block 15 which, in turn, clocks the counter chain and reloads the shifter, upon reaching full count. The shift/load circuitry block 15 reaches full count at 8 bits for three consecutive cycles, reaches full count at 6 bits for one cycle and repeats the pattern of counts. The shifter 17 is clocked at 50 Hz and shifts 30 bits per subframe before the shift/load circuitry block 15 loads a new subframe. The counting through the addresses of the second EPROM is performed by the shift/load circuitry block 15 according to the same pattern of counts. The 30 bits per subframe comprising the navigation message at 50 Hz is output and modulo-2 added with the coarse acquisition code, at 1.023 MHz, which effectively pulse modulates the coarse acquisition code at 50 Hz.

Figure 5G:
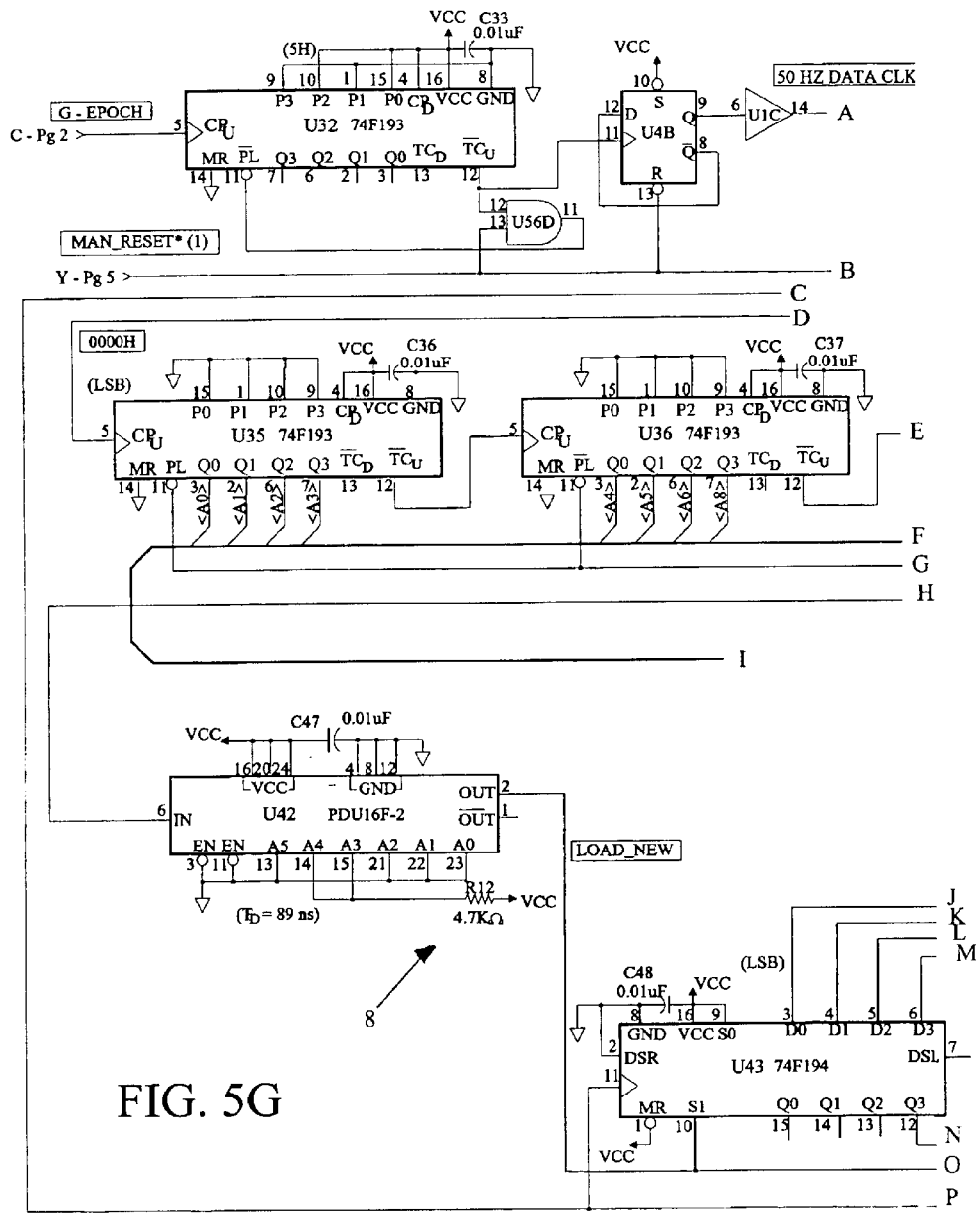
Figure 5H:
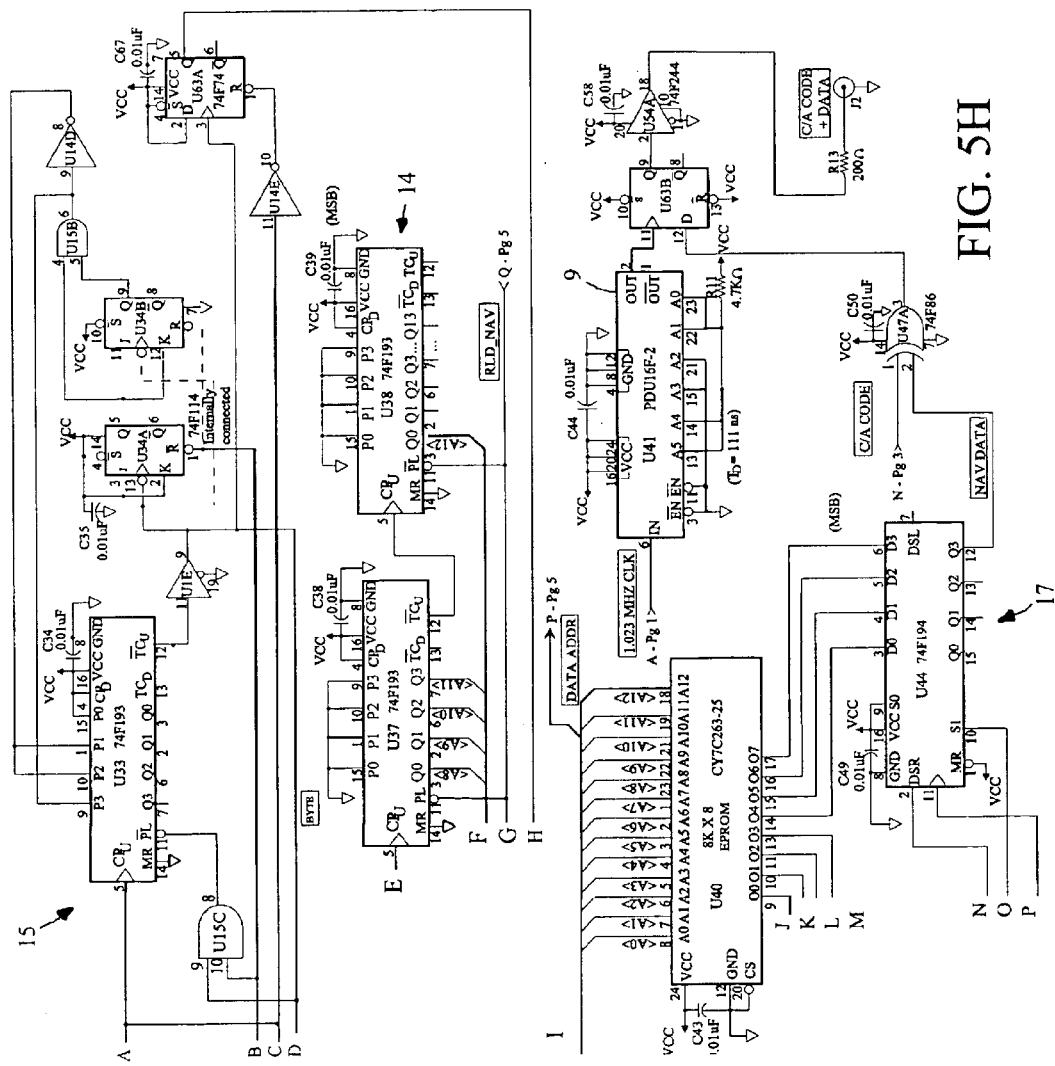

The navigation message generator circuit 8 is shown in detail, in FIGS. 5G-H and includes, a second EPROM 16, CY7C263-25, designated U40, for storing the navigation data. A 4-bit synchronous counter 74F193, designated U32, a flip-flop 74F74, designated U4B, a buffer 74F244, designated U1C and an AND gate designated U56D divide the frequency of the G-Epoch signal to a 50 Hz data clock. The G-Epoch signal is input to U32 on the CPU pin. Voltage is maintained on the CPD pin and on pins P0 and P2. The counter outputs a pulse on the TCU pin, which is connected to the clock input of U4B. The inverted output of U4B is returned to its D-input (pin 12). The arrival of a pulse from TCU of U32 causes U4B to output on pin Q through the buffer U1C as a 50 Hz clock signal for shifting out navigation data and for clocking unique circuitry for shifting data bits from the second EPROM 16. The output of TCU from U32 is also input to U56D with the main reset and the output of U56D is returned to the PL pin of U32 to clear the counter.

The unique shift/load circuitry block 15 for shifting the data bits from the second EPROM 16 includes a 4-bit synchronous counter 74F193, designated U33, a pair of flip-flops 74F114, designated U34A and U34B, an AND gate, designated U15B, a voltage buffer designated U15B and an inverter designated U14D. The 50 Hz data clock is input to the CPU pin of U33. Voltage is maintained on the CPD and P0 pins of U33 and the output from the TCU pin is input to the clock pins of U34A and U34B. The outputs of U34A and U34B are input to U15B. The output of U15B is input to P3 of U33 and the inverted output of U15B is input to P1 and P2 of U33 via U14D. The signal from the flip-flops U34A and U34B causes the maximum count of U33, output as a pulse on the TCU pin, to vary in a pattern of three groups of 8 counts followed by one group of 6 counts.

The navigation message generator circuit 8 includes a counter chain 14 also shown in detail in FIGS. 5G-H comprising four 4-bit synchronous counters 74F193, designated U35, U36, U37 and U38. The output from the TCU pin of U33 is input to the clock pin of U35 through voltage buffer UlE. Voltage is maintained on CPD causing U35 to count the clock pulses and to output the 4-bit count on pins Q0–Q3. U35 outputs a pulse on pin TCU when the maximum count is reached. The pulse is input to the CPU pin of U36 which performs the same function and is likewise connected to U37, which is connected to U38, in like manner, except that the output from U38 is taken only from Q0. The output from U35–U38 comprises a 13-bit count input to U40 to count through the addresses of the second EPROM 16 containing the 1500 bit word repeated 40 times.

The shift/load circuitry block 15, shown in detail in FIGS. 5G-H also includes a flip-flop 74F74, designated U63A, a 6-bit programmable delay line PDU16F-2, designated U42, and two 4-bit shift registers 74F194, designated U43 and U44. The navigation data is output on eight pins of U40 (second EPROM 16), O0–O7 and is input to the four data pins on U43 and the four data pins on U44, D0–D3. Voltage is maintained on the S0 pins of U43 and U44 and the S1 pins receive the pulse output from U42, which is clocked by the output from the TCU pin of U33, through voltage buffer UIE and flip-flop U63A, to reload U43 and U44. The output from the Q3 pin of U43 is input to the DSR pin of U44. The navigation data is shifted out from the Q3 pin of U44. The shifting is clocked by the 50 Hz data clock input to pin 11 of U43 and U44. A voltage is applied to pins A3 and A4 of U42, causing a delay of 89 nanoseconds on the input pulse and the output of U42 performs the register loading of U43 and U44. The navigation data is shifted out at a rate of 50 Hz but the reloading is performed according to the pattern of the U33 output, delayed by 89 nanoseconds, to count through 8 bits in each of three bytes and 6 bits of the next byte so as to count and shift 30 bits per subframe in the second EPROM 16.

Figure 5I:
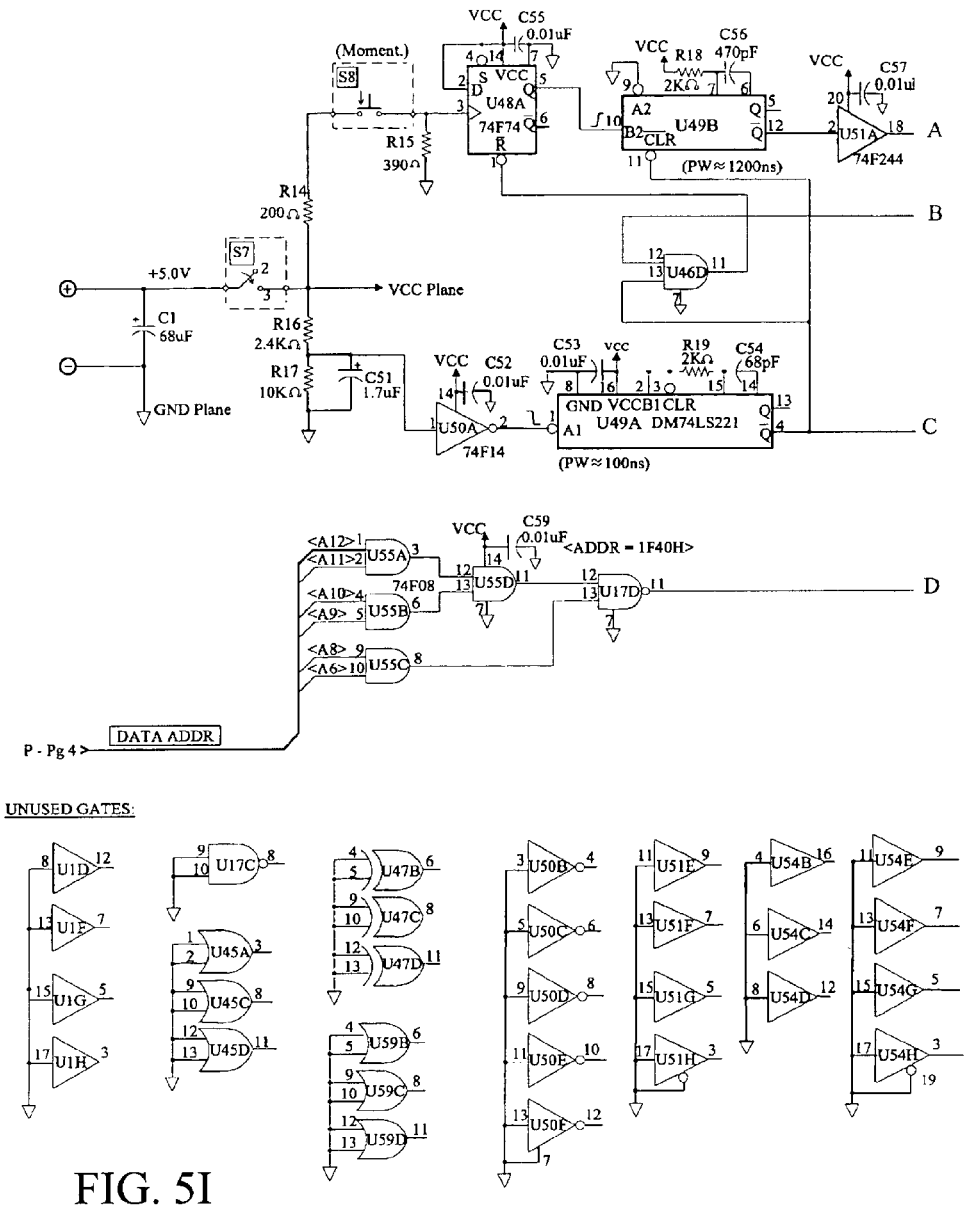
Figure 5J:
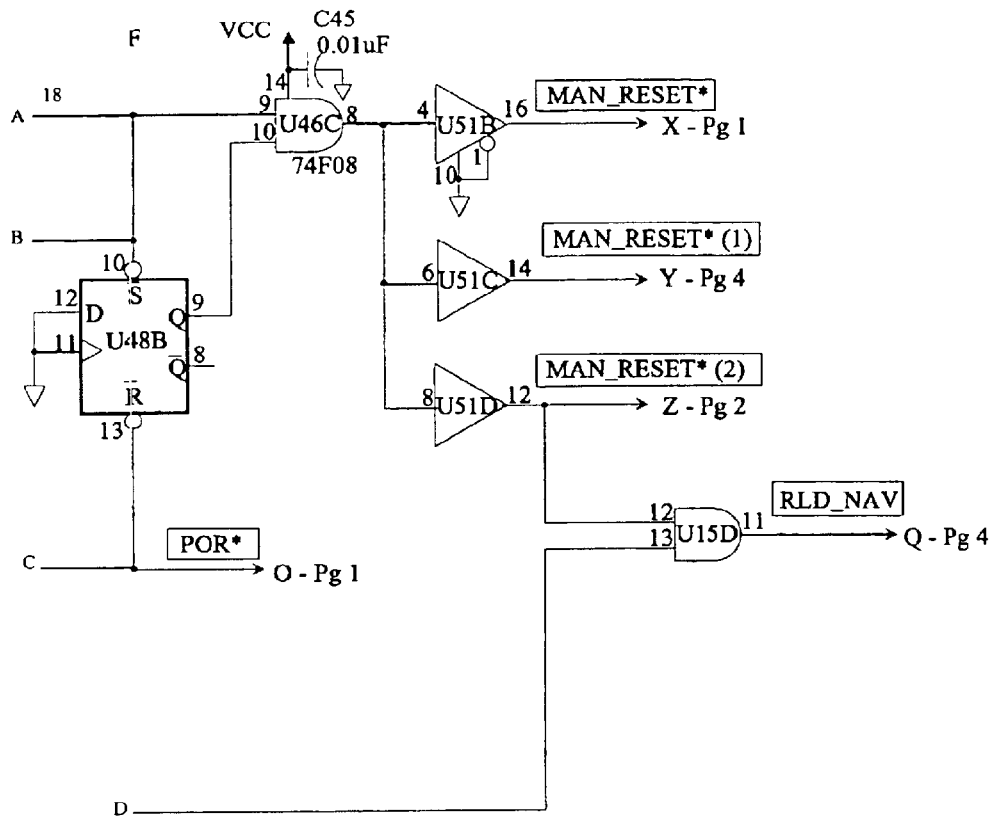
Figure 5J:
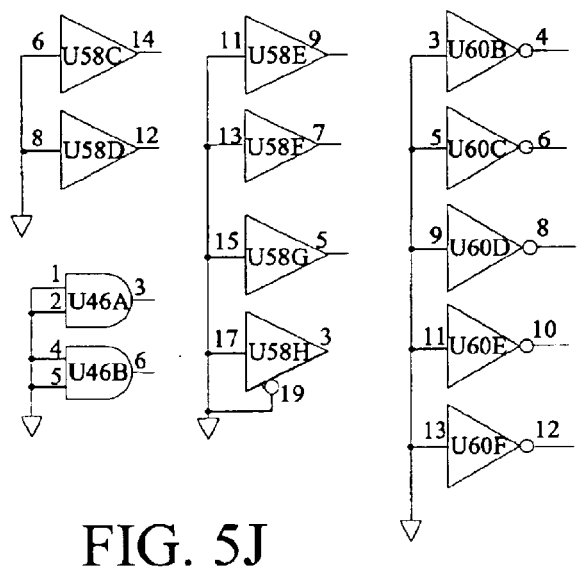

In order to reset the counter chain 14 to return to an address designated zero, to represent the beginning of the navigation message, in the second EPROM 16, a pulse is input to the PL pin of U35–U38. In the preferred embodiment, the circuitry is shown, in detail, in FIGS. 5I-J and consists of AND gates designated U55A–U55D and U17D. Selected data bits, A6, A8, A9, A10, A11 and A12, from the counter chain 14 are input to the AND gates U55A–U5D, as shown in FIGS. 5I-J and the output is input to an inverted AND gate, designated U17D. Upon the occurrence of an address determined by the selected data bits, the inverted AND gate U17D outputs a signal through the AND gate designated U15D to reset the counter chain 14.

Figure 4:
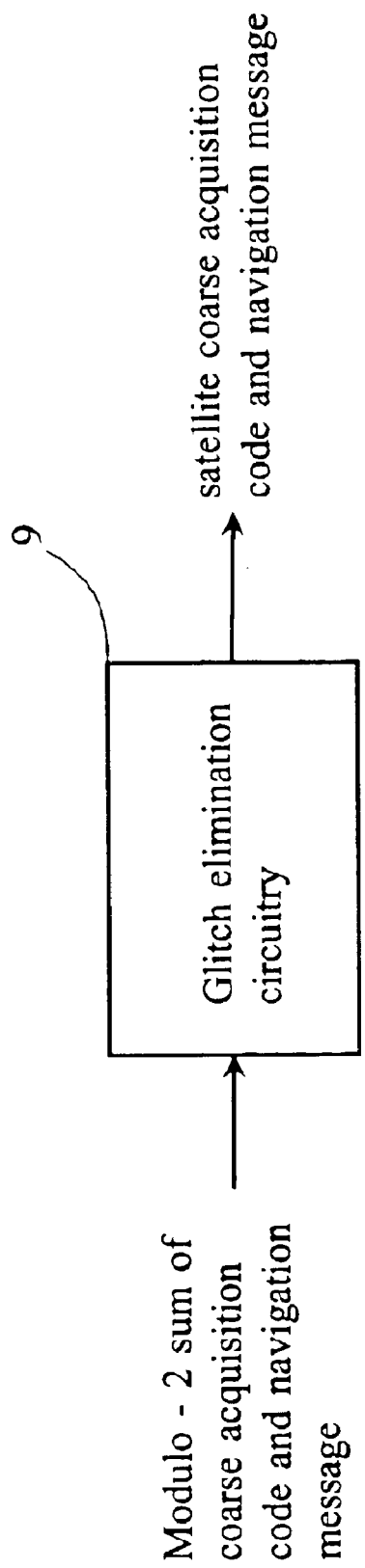
FIG. 4 is a block diagram of the glitch elimination circuitry.

The satellite emulator has glitch elimination circuitry 9 which is clocked by the 1.023 MHz signal, shown in FIG. 1 and FIG. 4. The glitch elimination circuitry 9 delays the clock signal by 111 nanoseconds and outputs the delayed clock to a flip-flop which also receives input of the modulo-2 added navigation message and coarse acquisition code. The delay is chosen to allow all of the inadvertent pulses coming from the inherent misaligned logic edges resulting from modulo-2 addition to reach a settled state before being clocked through to the output. The glitch elimination circuitry 9 eliminates the misaligned logic edges in the modulo-2 added signal. The output signal is buffered and impedance controlled before being output to the biphase shift keying modulator 2. The biphase shift keying modulator 2 modulates the signal on the carrier and outputs the modulated carrier through the attenuator 10 to the coaxial cable. The glitch elimination circuitry 9 is shown in detail in FIGS. 5G-H and includes a 6-bit programmable delay line PDU16F-2, designated U41, a flip-flop 74F74, designated U63B and a buffer 74F244, designated U54A. Voltage is maintained on pins A0, A1, A4 and A5, of U41 and the 1.023 MHz clock is input. The output of U41 is input to the clock pin of U63B. This signal is the 1.023 MHz clock signal, delayed by 111 nanoseconds. The flip-flop U63B, also receives input of the modulo-2 addition of the coarse acquisition code and the navigation data, on the D-pin. The misaligned logic edges of the modulo-2 added signal reach a settled state during the delay and are output from U63B, free of glitches. The output of U63B is taken from the Q pin and output through the buffer U54A to the biphase shift keying modulator 2.

The satellite emulator has a power switch, connected to a power source, and a reset switch which clears all registers. The power source, power switch and reset functions are shown, in detail, in FIGS. 5I-J. The preferred embodiment includes a 5 volt power source and reset circuitry including a pair of flip-flops 74F74, designated U48A and U48B, a pair of mono-stable multivibrators DM74LS221, designated U49A and U49B, buffers designated U51A—U51D, an inverter designated U50A and AND gates designated U46C and U46D. The flip-flops and the mono-stable multivibrators cooperate to output one or more pulses through the AND gates and the buffers such that a pulse or pulses are output to energize or reset the satellite emulator in response to activation of the power or reset switch. The inverter U50A employs hysteresis as voltage varies with activation of the power or reset switch.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A global positioning system satellite emulator for testing the capacity of a GPS system receiver to receive, demodulate and process navigation data and coarse acquisition code comprising:

an oscillator;

a radio frequency bi-phase shift key modulator receiving an input from the oscillator;

a clock signal generator circuit receiving input from the oscillator, for generating a clock signal;

a G-epoch generator circuit receiving an input from the clock signal generator circuit and for outputting a G-epoch signal, at a frequency different from the clock signal;

a first linear feedback shift register receiving the G-epoch signal and the clock signal, and for outputting a G-1 signal;

space vehicle select circuitry including a first EPROM including a set of user activated switches for encoding said first EPROM with G-2 signal delay data for emulating the G-2 signal of a selected satellite;

a navigation message generator circuit receiving input of the G-epoch signal, said navigation message generator circuit having a second EPROM for storing and outputting a navigation message; and glitch elimination circuitry.

2. The satellite emulator of claim 1, where the oscillator is selected to have an output frequency accuracy of +/−10 kHz.

3. The satellite emulator of claim 1, where said navigation message generator circuit includes frequency divider circuit.

4. A process for emulating the signal of a global positioning satellite for testing the capacity of a GPS system receiver to receive, decode and demodulate navigation data and coarse acquisition code comprising the steps of:

initiating at least two phase locked oscillating signals, one of which is a radio frequency and an other is a second frequency;

bi-phase shift key modulating the radio frequency signal;

generating a clock signal from the oscillating signal of said second frequency;

generating a G-Epoch signal from said clock signal;

inputting the G-Epoch signal and the clock signal to a linear feedback shift register and generating a G-1 signal;

inputting the G-Epoch signal and the clock signal to a linear feedback shift register and multiplexing the signal from the linear feedback shift register to a pair of multiplexers;

selectively encoding a first EPROM with G-2 signal delay data of a selected satellite for decoding said multiplexers and outputting a serial G-2 signal from each of the pair of multiplexers;

modulo-2 adding the output of serial G-2 signal from the pair of multiplexers and outputting G-2 signal of the selected satellite;

modulo-2 adding the G-1 and G-2 signals and outputting the coarse acquisition code of the selected satellite;

generating a navigation message from navigation data stored in an EPROM by outputting a clocked pulse from a counter chain to the EPROM and shifting the navigation data in data words as data bytes in 30 bit subframes of three 8-bit bytes and one 6-bit byte, and shifting out a new byte of the subsequent subframe after the sixth bit of each fourth data byte;

outputting the navigation message;

modulo-2 adding the coarse acquisition code and navigation message of the selected satellite and outputting modulated coarse acquisition code and navigation message of the selected satellite;

delaying the modulated coarse acquisition code and navigation message to allow pulses coming from misaligned logic edges to reach a settled state and outputting the modulated coarse acquisition code and navigation message;

bi-phase shift key modulating the modulated coarse acquisition code and navigation message on the radio frequency signal.

5. The process of claim 4 where the clocked pulse shifting the navigation message is input at a frequency of 50 Hz.

6. The process of claim 5 where the second phase locked oscillating signal is at a frequency of 10.23 MHz and the clock signal is at a frequency of 1.023 MHz.

7. A method for testing the capacity of a GPS receiver to lock on to the signal of a selected satellite and to properly receive, decode and process the signal, using a satellite emulator, comprising the steps of:

disconnecting an existing antenna from an antenna jack of the existing GPS receiver, and positioning a set of switches on the satellite emulator in accordance with the signal characteristics of the particular satellite for which the receiver is to be tested;

connecting the output of the satellite emulator to the vacant antenna jack of the receiver and energizing the satellite emulator and the receiver;

verifying that the receiver has the capacity to receive and process the signal from the satellite, which the user has selected.

* * * * *